US011829240B2

(12) United States Patent
Scrivano

(10) Patent No.: US 11,829,240 B2
(45) Date of Patent: Nov. 28, 2023

(54) PREVENTING DUPLICATION OF FILES IN A STORAGE DEVICE

(71) Applicant: RED HAT, INC., Raleigh, NC (US)

(72) Inventor: Giuseppe Scrivano, Spezzano della Sila (IT)

(73) Assignee: Red Hat, Inc., Raleigh, NC (US)

( * ) Notice: Subject to any disclaimer, the term of this patent is extended or adjusted under 35 U.S.C. 154(b) by 51 days.

(21) Appl. No.: 17/569,760

(22) Filed: Jan. 6, 2022

(65) Prior Publication Data

US 2023/0214290 A1    Jul. 6, 2023

(51) Int. Cl.
G06F 11/10 (2006.01)
G06F 16/176 (2019.01)
G06F 11/14 (2006.01)
G06F 11/07 (2006.01)

(52) U.S. Cl.
CPC ...... *G06F 11/1004* (2013.01); *G06F 11/0793* (2013.01); *G06F 11/1435* (2013.01); *G06F 16/1774* (2019.01)

(58) Field of Classification Search
None
See application file for complete search history.

(56) References Cited

U.S. PATENT DOCUMENTS

| 7,096,389 B2* | 8/2006 | Hornung ............. G06F 11/1048 714/42 |
| 7,523,452 B1* | 4/2009 | Kamity ..................... G06F 8/65 717/178 |
| 8,521,704 B2 | 8/2013 | Bandopadhyay |
| 8,554,748 B1* | 10/2013 | Kamity ............... G06F 9/44578 707/634 |
| 8,868,494 B2* | 10/2014 | Agrawal ............... G06F 16/273 707/610 |
| 9,514,145 B2 | 12/2016 | Chhaunker et al. |
| 9,875,029 B2 | 1/2018 | Bromley et al. |
| 10,127,242 B1 | 11/2018 | Chatterjee et al. |
| 10,409,693 B1 | 9/2019 | Liang et al. |
| 10,635,639 B2 | 4/2020 | Khot et al. |

(Continued)

FOREIGN PATENT DOCUMENTS

CN    112104725 A    12/2020

OTHER PUBLICATIONS

F. M. Boian and R. F. Boian, "Solving Storage Limitations Using a Peer-to-Peer Web File System," 2008 10th International Symposium on Symbolic and Numeric Algorithms for Scientific Computing, Timisoara, Romania, 2008, pp. 335-339, doi: 10.1109/SYNASC.2008.81. (Year: 2008).*

(Continued)

*Primary Examiner* — Daniel F. McMahon
(74) *Attorney, Agent, or Firm* — Kilpatrick Townsend & Stockton LLP

(57) ABSTRACT

Duplication of files in a storage device of a computing device can be avoided using some techniques described herein. In one example, a system can determine a checksum of a file in a software package. The system can then determine that the file is absent from a storage device by issuing a command for accessing the file based on the checksum. In response to determining that the file is absent from the storage device, the system can download a copy of the file from a remote computing device to the storage device over a network.

18 Claims, 4 Drawing Sheets

(56) References Cited

U.S. PATENT DOCUMENTS

| | | | | |
|---|---|---|---|---|
| 2006/0047662 A1* | 3/2006 | Barik | ............... | G06F 21/6227 |
| 2012/0066762 A1* | 3/2012 | Todorovic | ............... | G06F 21/53 |
| | | | | 726/22 |
| 2013/0054540 A1* | 2/2013 | Factor | ............... | G06F 16/1752 |
| | | | | 707/E17.005 |
| 2014/0201170 A1* | 7/2014 | Vijayan | ............... | G06F 11/1451 |
| | | | | 707/692 |
| 2018/0165080 A1* | 6/2018 | Dimitrov | ............... | G06F 8/60 |
| 2019/0251190 A1* | 8/2019 | Scrivano | ............... | G06F 16/162 |
| 2021/0019283 A1* | 1/2021 | Landman | ............... | G06F 16/148 |
| 2021/0141760 A1* | 5/2021 | Li | ............... | G06F 16/156 |

OTHER PUBLICATIONS

Zhang, S., et al., "BED: A Block-Level Deduplication-Based Container Deployment Framework," Green, Pervasive and Cloud Computing, 2020, pp. 504-518, https://www.researchgate.net/publication/347352424_BED_A_Block-Level_Deduplication-Based_Container_Deployment_Framework.

Chawla, N., "Understanding the Concepts Behind Virtual Data Optimizer (VDO) in RHEL 7.5 Beta," Red Hat, Feb. 5, 2018, https://www.redhat.com/en/blog/understanding-concepts-behind-virtual-data-optimizer-vdo-rhel-75-beta.

* cited by examiner

PREVENTING DUPLICATION OF FILES IN A STORAGE DEVICE

TECHNICAL FIELD

The present disclosure relates generally to file systems on computers. More specifically, but not by way of limitation, this disclosure relates to preventing files that may be present in a storage device from being duplicated when a software package is obtained from a remote computing device.

BACKGROUND

A remote computing device can be a computing device that a user may not have physical access to, but that can be accessed remotely over a computer network. The remote computing device may include a software package that includes one or more files. The software package may also include a manifest file, which may contain checksums corresponding to the one or more files. Users may download the software package to their local computers from the remote computing device.

DETAILED DESCRIPTION

Figure 1:
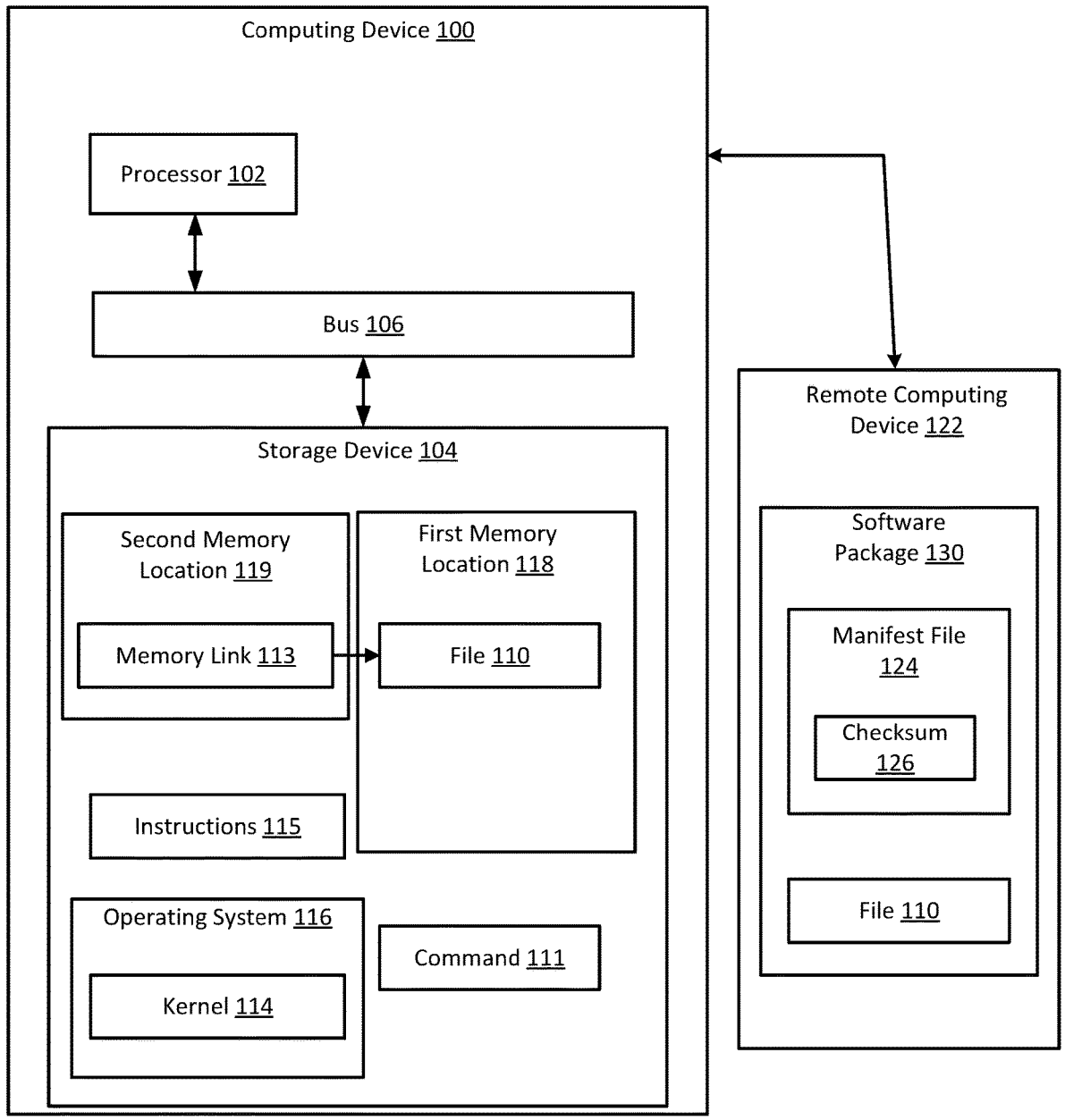
FIG. 1 is a block diagram of an example of a system that can avoid duplication of files in accordance with some aspects of the present disclosure.

A remote computing device can be accessed remotely by a user of a computing device over a network. The remote computing device may include software packages that each include one or more files. The user may download the software packages from the remote computing device and store them in a storage device of the computing device. But often times, multiple software packages will share the same files. As a result, a user may download the same files multiple times across multiple software packages, resulting in the same files being repeatedly downloaded and stored in to the storage device. This can be problematic because it can increase bandwidth consumption, storage consumption, and use of network resources. While some storage devices may have built-in mechanisms to perform deduplication operations that remove duplicate files once they are already stored on the storage devices, such deduplication operations are an additional computational burden on the storage devices and consume computing resources (e.g., processing power, memory, and energy). Also, the deduplication operations do not prevent the initial consumption of network resources and storage space resulting from downloading the duplicate files to begin with.

Some examples of the present disclosure can overcome one or more of the abovementioned problems by preventing files that are already present in the storage device from being downloaded again from a remote computing device. For example, a user may wish to download a software package from the remote computing device to the user's computing device. The software package can contain multiple files. The software package can also contain a manifest file with checksums for the multiple files. In some such examples, the user's computing device can have an operating system with a modified kernel that can obtain the manifest file from the remote computing device and use the checksums to determine whether each of the files already exists in the computing device's storage device. If a copy of a file is already present in the storage device, the kernel can prevent the file from being downloaded. The kernel can also create a memory link to the memory location in which the copy of the file is already stored in the storage device. In this way, the kernel can prevent duplicates of the file from being downloaded and stored in memory. Alternatively, if a copy of a file is not present in the storage device, the kernel may allow the file to be downloaded from the remote computing device and stored in the storage device. Using these techniques, the kernel can serve as an intermediary component that can allow or prevent files of the software package from being downloaded depending on whether they already exist in the storage device. This can avoid the unnecessary consumption of bandwidth, storage space, and network resources typically associated with downloading duplicates of files.

As noted above, the kernel of the operating system can use a checksum of a file in the software package to determine whether or not the file is present in the storage device. For example, the software package may include a manifest file, which can have the checksum of the file in the software package. The kernel can retrieve the manifest file from the remote computing device and extract from the manifest file the checksum of the file. The kernel can then determine whether the file exists in the storage device by issuing a command based on the checksum. One example of the command may be a fs-verity command that takes the checksum as an argument. If the file is absent from (e.g., does not exist in) the storage device, the command may return an error value. Otherwise, the command may return a non-error value such as a file descriptor for the file. By issuing such commands, the kernel can determine which files do or do not already exist in the storage device.

Prior to issuing the abovementioned commands, the kernel may modify an attribute of a file to make the file immutable. This can be done using an input/output (I/O) control. The I/O control may be an fs-verity I/O control, such as FS_IOC_ENABLE_VERITY. This can be done to prevent the file from being modified once the abovementioned commands are issued, since the commands may involve opening the file. Making the file immutable can ensure an integrity of the file once it is opened by the kernel and prevent security risks associated with unwanted modifications to the file.

In some examples, the software package may be a container image usable to deploy a container (e.g., an Open Container Initiatives container) in a computing environment. Containers can be relatively isolated virtual environments in which applications or services can execute. Container images can contain one or more layers. Each of the one or more layers can contain a subset of the files. The layers may be stored as tarballs or in another format. When the container image is pulled locally, each layer can be extracted and stored in its own directory.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for preventing the duplication of files in accordance with some aspects of the present disclosure. The system can include a computing device 100 and a remote computing device 122 that can be communicatively coupled to one another via a network, such as a local area network or the Internet.

The remote computing device 122 can provide one or more software packages, such as software package 130. For instance, the remote computing device 122 may be a server for a repository from which software packages can be downloaded. The software package 130 may include one or more files, such as file 110. Examples of the files can include libraries, binary files, configuration files, and other files usable to run the software package 130. The software package 130 can also include a manifest file 124, which can be distinct from the other files of the software package 130. The manifest file 124 can include checksums corresponding to each file in the software package 130. For example, the manifest file 124 can include a checksum 126 corresponding to the file 110. The checksum 126 can be a hashed value of the content of the file 110.

The computing device 100 can include a processor 102 that can be communicatively coupled to a storage device 104 via a bus 106. The processor 102 can include one processor or multiple processors. Non-limiting examples of the processor include a Field-Programmable Gate Array (FPGA), an application-specific integrated circuit (ASIC), a microprocessor, etc. The processor 102 can execute instructions 115 stored in the storage device 104 to perform one or more operations. In some examples, the instructions 115 can include processor-specific instructions generated by a compiler or an interpreter from code written in any suitable computer-programming language, such as C, C++, C #, etc.

The storage device 104 can include one memory device or multiple memory devices. Such memory devices can include a volatile memory device, a non-volatile memory device, or both. Examples of the storage device 104 can include a hard drive, hard disk, random access memory (RAM), or cache memory. While the storage device 104 is shown in FIG. 1 as being a local storage device that is internal to the computing device 100, in other examples the storage device 104 can be external to the computing device 100 and coupled thereto. For example, the storage device 104 can be coupled to the computing device 100 by a cable or a local area network. In one such example, the storage device 104 may be a distributed storage system accessible to the computing device 100 via a local area network. Thus, the storage device 104 can be any suitable memory device capable of having its file content controlled by the computing device 100.

The computing device 100 may include an operating system 116, such as a Linux operating system like Red Hat Enterprise Linux®, which may include a kernel 114. When executed by the processor 102, the kernel 114 can download the manifest file 124 to the storage device 104 and extract the checksums therefrom.

To determine whether one of the files 110 in the software package 130 is already stored in the storage device 104, the kernel 114 may issue one or more commands 111 to access the file 110 based on the checksum 126. Examples of the commands can include an FD command that can output a file descriptor for the file 110, and a FS_OPEN_FILE_BY_DIGEST command that can accept the file descriptor as an argument to access the file 110. Prior to issuing the commands 111, the kernel 114 may modify an attribute of the file 110 such that the file 110 is immutable. Making the file 110 immutable can ensure an integrity of the file 110 and prevent security risks associated with unwanted modifications the file 110. This can be accomplished with FS-VERITY or a similar input/output (I/O) control. Issuance of the one or more commands 111 may cause the processor 102 to determine whether the file 110 is present in the storage device 104 and generate a response to the command indicating the same. For example, if the file 110 is not present in the storage device 104, the command 111 may return an error value, such as ENOENT ("error no entry"). If the file 110 is present in the storage device 104, a file descriptor for the file may be returned.

If the file 110 is not already present in the storage device 104, the kernel 114 can allow the file 110 to be downloaded to a first memory location 118 from the remote computing device 122. If the file 110 is already present at the first memory location 118, the kernel 114 prevent the file 110 from being downloaded again to the storage device 104. The kernel 114 may also create a memory link 113 in a second memory location 119 that can point to the first memory location 118. The memory link 113 can be used by an application to access the file 110.

Although FIG. 1 shows a certain number and arrangement of components, this is intended to be illustrative and non-limiting. Other examples may include more components, fewer components, different components, or a different arrangement of the components than is shown in FIG. 1. Additionally, in other examples the functionality of the kernel 114 described above may be implemented by other software components, such as another part of the operating system 116 or a software application running on top of the operating system 116.

Figure 2:
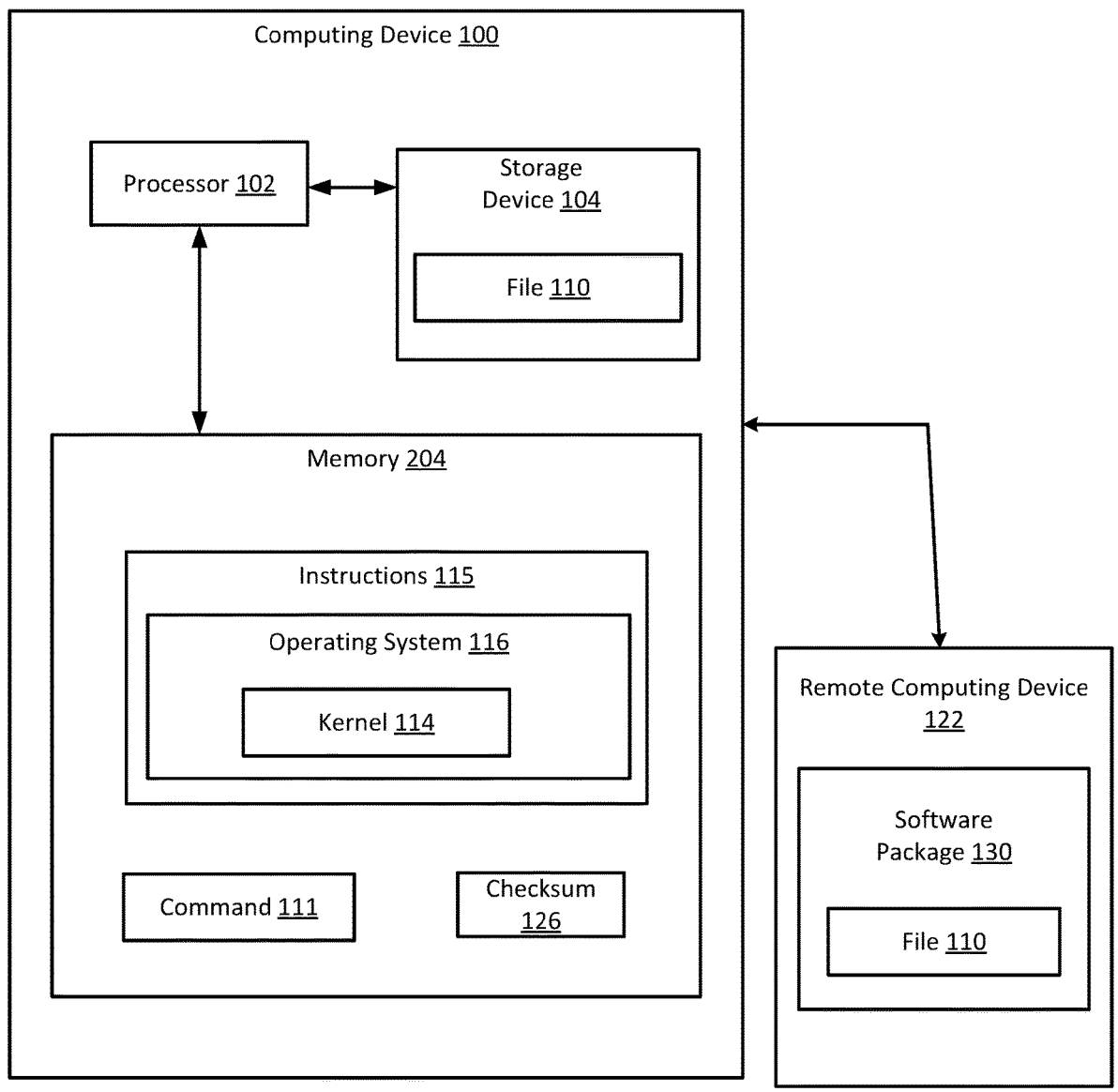
FIG. 2 is a block diagram of another example of a system that can be used for avoiding duplication of files in accordance with some aspects of the present disclosure.

FIG. 2 is a block diagram of another example of a system for preventing duplicates of files in accordance with some aspects of the present disclosure. The system can include a computing device 100, such as a laptop computer, desktop computer, mobile phone, tablet, or e-reader. The computing device 100 can be communicatively coupled to a remote computing device 122 via a network. The remote computing device 122 can include a software package 130. The software package 130 may include a file 110 that is downloadable to the computing device 100.

The computing device 100 can include a processor 102 that can be communicatively coupled to a memory 204. Although the memory 204 is shown as distinct from the storage device 104 in FIG. 2, in other examples the memory 204 and the storage device 104 may be the same.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory device can include a computer-readable medium from which the processor 102 can read instructions 115. A computer-readable medium can include electronic, optical, magnetic, or other storage devices capable of providing the processor 102 with computer-readable instructions or other program code. Non-limiting examples of a computer-readable medium include a magnetic disk, memory chip, ROM, random-access memory (RAM), an ASIC, a configured processor, optical storage, or any other medium from which a computer processor can read the instructions 115.

In some examples, the instructions 115 may include a kernel 214 of an operating system 116. The instructions 115 can be executable by the processor 202 to perform operations. For example, the processor 202 can determine the checksum 126 of the file 110. The checksum 126 can be determined by retrieving a manifest file 124 from the remote computing device 122 and extracting the checksum of the file 110 from the manifest file 124. The processor 202 can then determine that the file 110 is absent from the storage device 124 by issuing a command 111 for accessing the file 110 based on the checksum 126. In response to determining that the file 110 is absent from the storage device 124, the processor 202 can download a copy of the file 110 from a remote computing device 122 to the storage device 124 over a network. Alternatively, in response to determining that the file 110 does exist in the storage device 124, the processor 202 can prevent a copy of the file 110 from being downloaded from the remote computing device 122 to the storage device 124. The processor 202 may also create a memory link in the storage device 124 to the existing location of the file 110, as described earlier.

Figure 3:
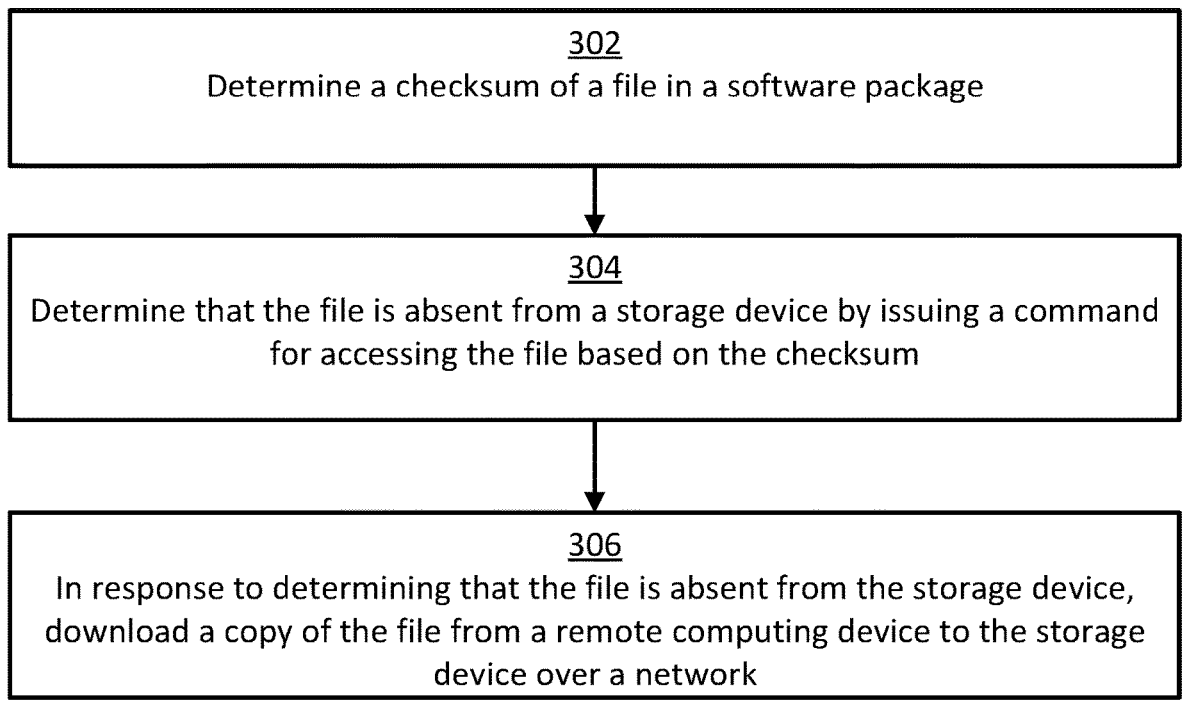
FIG. 3 is a flow chart of an example of a process for avoiding duplication of files in accordance with some aspects of the present disclosure.

FIG. 3 is a flow chart of an example of a process for avoiding duplication of files in accordance with some aspects of the present disclosure. Other examples can include more steps, fewer steps, different steps, or a different combination of steps than are shown in FIG. 3. The steps of FIG. 3 are discussed below with reference to the components discussed above in relation to FIGS. 1-2.

In block 302, a kernel 114 executing on a processor 102 determines a checksum 126 of a file 110 in a software package 130. The checksum 126 may be determined by the kernel 114 by computing a hash of the file 110. Additionally or alternatively, the checksum 126 can be precomputed and retrieved from a manifest file 124 that can be downloaded from the remote computing device 122.

In block 304, the kernel 114 determines that the file 110 is absent from (e.g., does not exist in) a storage device 104 by issuing a command 111, such as an fs-verity command, for accessing the file 110 based on the checksum 126. Based on a response from issuing the command 111, the kernel 114 can determine whether or not the file 110 exists in the storage device 104. For example, if the command 111 returns an error, it may mean that the file 110 is absent from the storage device 104. The error may be an ENOENT ("error no entry") error. If the command 111 returns a file descriptor for the file 110, it may mean that the file does exist in the storage device 104.

In block 306, the kernel 114 downloads a copy of the file 110 from a remote computing device 122 to the storage device 104 in response to determining that the file 110 is absent from the storage device 104. This may involve communicating with the remote computing device 122 to initiate a file download. Downloading the copy of a file 110 can involve retrieving the copy of the file from a remote target location and storing the copy of the file 110 in the storage device 104. The file download may take place on a network that can communicatively couple the remote computing device 122 to the computing device 100 that includes the storage device 104. Examples of such networks can include local area networks or the Internet.

Figure 4:
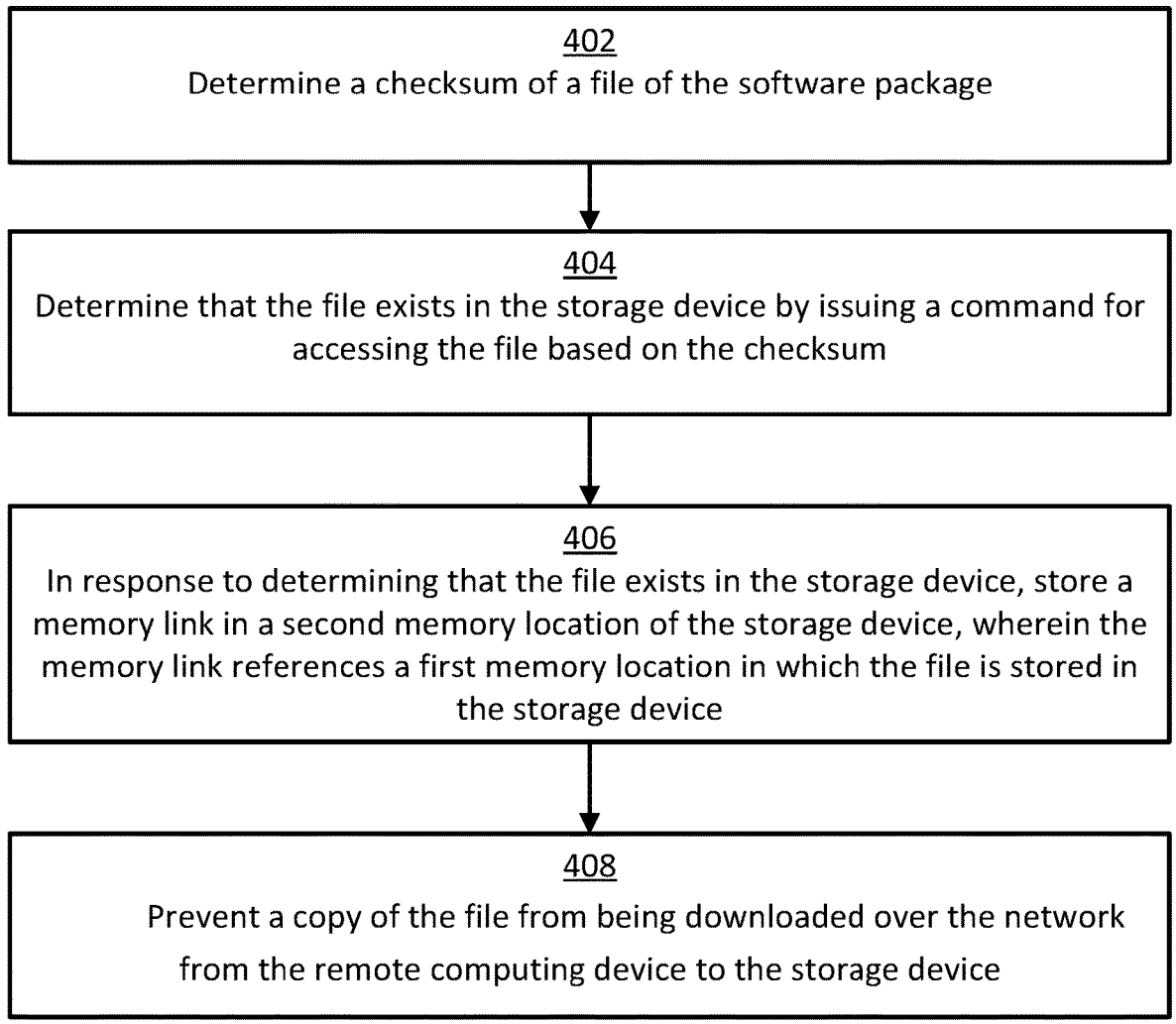
FIG. 4 is a flow chart of another example of a process for avoiding duplication of files in accordance with some aspects of the present disclosure.

FIG. 4 is a flow chart of another example of a process that may be used to avoid duplicating files in accordance with some aspects of the present disclosure. Other examples can include more steps, fewer steps, different steps, or a different combination of steps than are shown in FIG. 4. The steps of FIG. 4 are discussed below with reference to the components discussed above in relation to FIGS. 1-2.

In block 402, the kernel 114 determines a checksum 126 of a file 110 of the software package 130. The checksum 126 may be computed by the computing device 200 by calculating a hash value for the file 110. In some examples, the checksum 126 for the file 110 can be computed by taking a difference of a hex value (such as 0xFF) and the 8 least-significant hex bits of a sum of bytes contained in the file 110. The checksum 126 may be used to ensure that the file 100 has not been modified. In some examples, the file 110 may be marked as immutable before the checksum 126 is computed. This can ensure that the checksum 126 corresponds to a version of the file 110 that does not contain unwanted modifications. Additionally or alternatively, the checksum 126 can be retrieved from a manifest file 124 of the software package 130 that may be stored on the remote computing device 122.

In block 404, the kernel 114 determines that the file 110 exists in the storage device 104 by issuing a command 111 for accessing the file 110 based on the checksum 126. The command 111 can return a file descriptor for the file 110 if it is determined that the file 110 exists in the storage device 104. In some examples, the command 111 can include an FD command that can output a file descriptor for the file 110, and a FS_OPEN_FILE_BY_DIGEST command that can accept the file descriptor as an argument to access the file 110. Alternatively, the command 111 can return an error such as ENOENT ("error no entry") if the file is determined to not exist in storage device 104.

In block 406, the kernel 114 stores a memory link 113 in a second memory location 119 of the storage device 104 in response to determining that the file 110 exists in the storage device 104. The memory link 113 references a first memory location 118 in which the file 110 is stored in the storage device 104. The memory link 113 may be a reflink, an addlink, or any other kind of link between locations in the storage device 104. The memory link 113 may include a pointer whose value is stored in the second memory location 119 and that points to the first memory location 118.

In block 408, the kernel 114 prevents a copy of the file 110 from being downloaded over the network from the remote computing device 122 to the storage device 104. In some examples, preventing the copy of the file 110 from being downloaded may involve the kernel 114 rejecting or blocking a download command from a software application that requested the file 110 or the software package 130, so that the download is not initiated. In other examples, preventing the copy of the file 110 from being downloaded may involve the kernel 114 interfacing with a network card or driver (e.g., of the computing device 100) to prevent the download from being initiated or completed. For example, the kernel 114 may interface with a network card or driver to stop a download that is in progress, so that less than all of the file 110 is copied to the storage device 104. These techniques may prevent file deduplication methods, which can identify and delete duplicate files, from being called. This can also prevent storage space in the storage device 104 from being used and can prevent an unnecessary use of bandwidth over the network.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A non-transitory computer-readable medium comprising instructions for a kernel of an operating system, the kernel being executable by a processor for causing the processor to:
   determine a checksum of a file in a software package by:
      retrieving a manifest file from a remote computing device, the manifest file including checksums of files in the software package; and
      extracting the checksum of the file from the manifest file;
   determine that the file is absent from a storage device by issuing a command for accessing the file based on the checksum; and
   in response to determining that the file is absent from the storage device, download a copy of the file from the remote computing device to the storage device over a network.

2. The non-transitory computer-readable medium of claim 1, wherein the kernel is further executable by the processor for causing the processor to:
   determine another checksum of another file of the software package;
   determine that the other file exists in the storage device by issuing another command for accessing the other file based on the other checksum; and
   in response to determining that the other file exists in the storage device, store a memory link in a second memory location of the storage device, wherein the memory link references a first memory location in which the other file is stored in the storage device.

3. The non-transitory computer-readable medium of claim 2, wherein the kernel is further executable by the processor for causing the processor to, in response to determining that the other file exists in the storage device:
   prevent a copy of the other file from being downloaded over the network from the remote computing device to the storage device.

4. The non-transitory computer-readable medium of claim 1, wherein the kernel is further executable by the processor for causing the processor to:
   prior to issuing the command, modify an attribute of the file such that the file is immutable.

5. The non-transitory computer-readable medium of claim 1, wherein the command is configured to request a file descriptor of the file, and wherein the kernel is further executable by the processor for causing the processor to:
   determine that the file is absent from the storage device based on the command returning an error value rather than the file descriptor.

6. The non-transitory computer-readable medium of claim 1, wherein the command is an fs-verity command.

7. The non-transitory computer-readable medium of claim 1, wherein the software package is a container image that includes one or more layers of files.

8. A system comprising:
   a processor; and
   a memory including instructions for a kernel of an operating system, the kernel being executable by the processor for causing the processor to:
      determine a checksum of a file in a software package;
      determine that the file is absent from a storage device by:
         issuing a command for accessing the file based on the checksum, wherein the command is configured to request a file descriptor of the file; and
         receiving an error value rather than the file descriptor in return from issuing the command; and
      in response to determining that the file is absent from the storage device, download a copy of the file from a remote computing device to the storage device over a network.

9. The system of claim 8, wherein the kernel is further executable by the processor for causing the processor to:
   determine another checksum of another file of the software package;
   determine that the other file exists in the storage device by issuing another command for accessing the other file based on the other checksum; and
   in response to determining that the other file exists in the storage device, store a memory link in a second memory location of the storage device, wherein the memory link references a first memory location in which the other file is stored in the storage device.

10. The system of claim 9, wherein the kernel is further executable by the processor for causing the processor to, in response to determining that the other file exists in the storage device:
    prevent a copy of the other file from being downloaded over the network from the remote computing device to the storage device.

11. The system of claim 8, wherein the kernel is further executable by the processor for causing the processor to:
    prior to issuing the command, modify an attribute of the file such that the file is immutable.

12. The system of claim 8, wherein the kernel is further executable by the processor for causing the processor to determine the checksum of the file by:
    retrieving a manifest file from the remote computing device, the manifest file including checksums of files in the software package; and
    extracting the checksum of the file from the manifest file.

13. The system of claim 8, wherein the command is an fs-verity command.

14. The system of claim 8, wherein the software package is a container image that includes one or more layers of files.

15. A method comprising:
    determining, by a kernel executing on a processor, a checksum of a file in a software package by:
       retrieving a manifest file from a remote computing device, the manifest file including checksums of files in the software package; and
       extracting the checksum of the file from the manifest file;
    determining, by the kernel, that the file is absent from a storage device by issuing a command for accessing the file based on the checksum; and
    in response to determining that the file is absent from the storage device, downloading, by the kernel, a copy of the file from the remote computing device to the storage device over a network.

16. The method of claim 15, further comprising:
    determining, by the kernel, another checksum of another file of the software package;
    determining, by the kernel, that the other file exists in the storage device by issuing another command for accessing the other file based on the other checksum; and
    in response to determining that the other file exists in the storage device, storing a memory link in a second memory location of the storage device, wherein the memory link references a first memory location in which the other file is stored in the storage device.

17. The method of claim 16, further comprising:
preventing, by the kernel, a copy of the other file from being downloaded from the remote computing device to the storage device.

18. The method of claim 15, further comprising:
prior to issuing the command, modifying, by the kernel, an attribute of the file such that the file is immutable.

\* \* \* \* \*